Dec. 11, 1928.
G. A. BURNHAM
1,694,618
ELECTRICAL APPARATUS AND SWITCH
Filed April 29, 1924  2 Sheets-Sheet 1
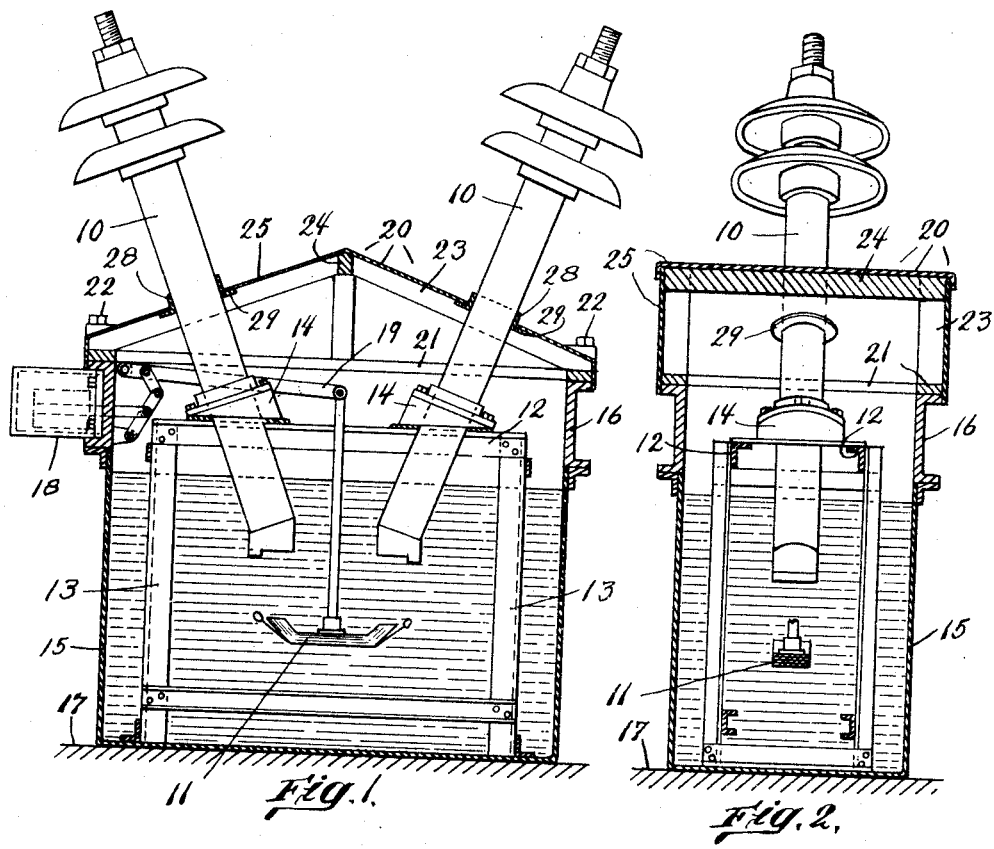
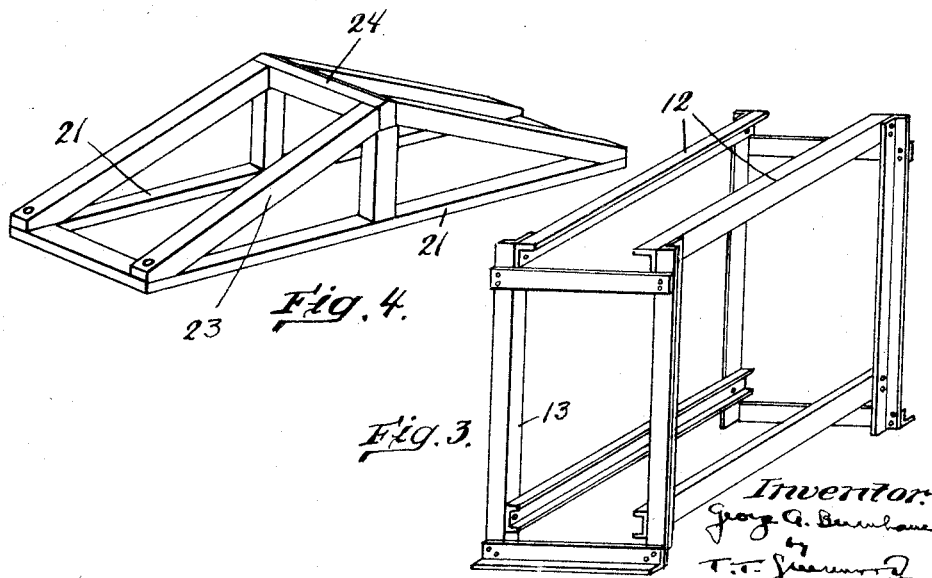

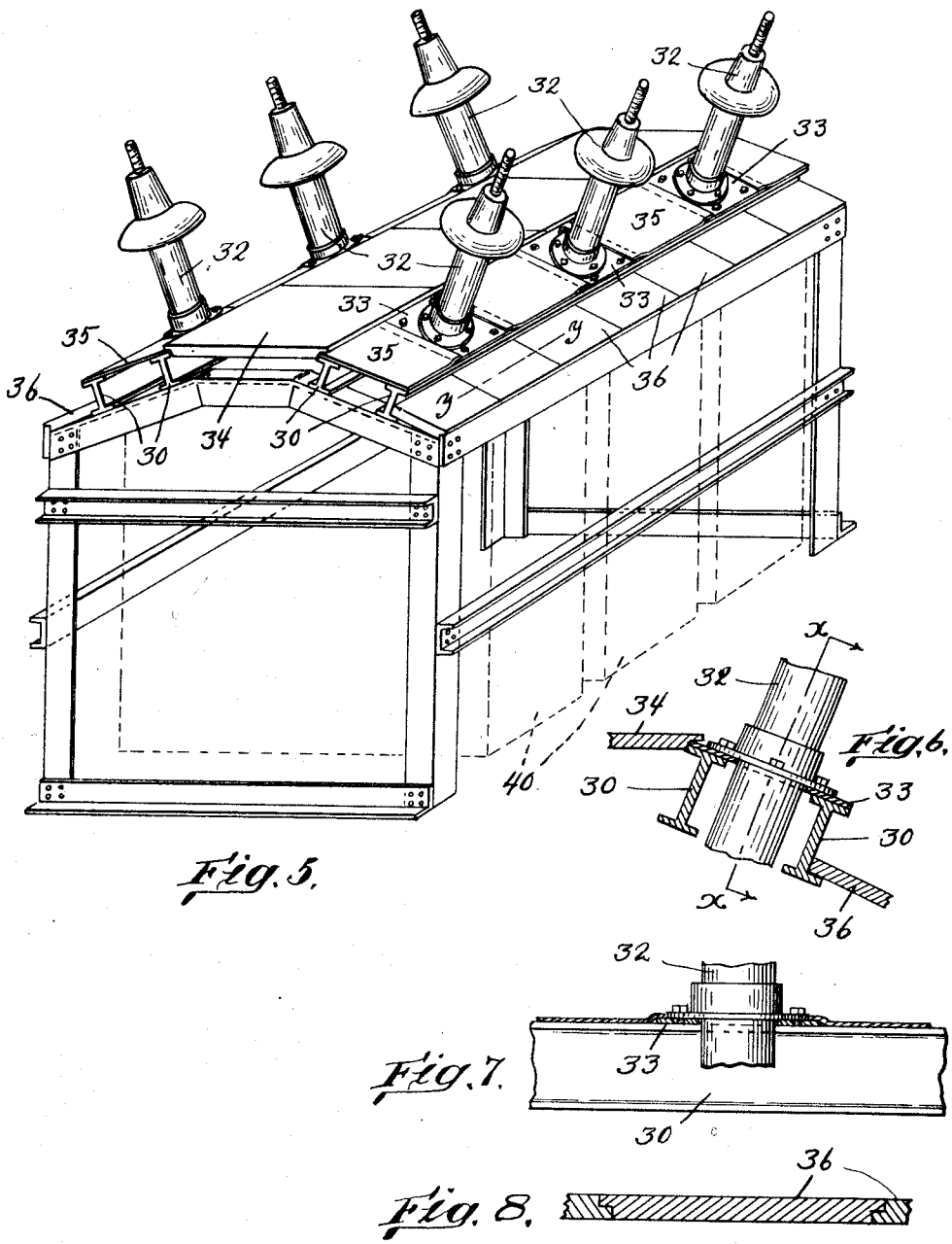

Patented Dec. 11, 1928.

1,694,618

UNITED STATES PATENT OFFICE.

GEORGE A. BURNHAM, OF SAUGUS, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

ELECTRICAL APPARATUS AND SWITCH.

Application filed April 29, 1924. Serial No. 709,921.

This invention relates to electrical apparatus wherein the current conducting components are immersed in a vaporizable fluid contained in an enclosing casing, and has particular reference to oil immersed electric switches.

When the circuit through an electric switch is interrupted under oil or some other arc quenching and vaporizable fluid, the oil is vaporized and under suitable conditions may mix with the air contained in the enclosing casing above the oil level and form an explosive mixture therewith. This explosive mixture may explode under suitable conditions and subject the switch structure to severe strains if not to damage the structure. While an electric switch having certain physical dimensions may be adequate to carry the normal current of the circuit to be protected, it may not be sufficiently strong to resist successfully the stresses brought to bear upon the structure due to an abnormal internal increase of pressure, as by an explosion. Consequently, it is quite customary to utilize switches of considerably greater size than is indicated by the normal load in the circuit controlled by the switch; whereby to provide a structure sufficiently large and strong to withstand the abnormal internal pressure due to explosions. A switch so constructed as to be able to resist explosion pressures is ordinarily quite expensive as contrasted with a switch capable of controlling the normal load in the circuit.

It is an object of this invention to provide an electric switch adapted to withstand the stresses incident to normal operating conditions and to have a relatively unimportant and inexpensive portion thereof which is adapted to be dislodged or destroyed by abnormal internal pressures incident to circuit interruption under heavy overload, or explosions, whereby to relieve the switch from such pressures without damage to the vital parts of the switch, so that continuity of service can be maintained.

In carrying out this object of the invention, I may provide the switch with a frame work adapted to support the stationary and movable switch members and operating mechanism. The frame work is so arranged that it presents but small area to the action of the internal gaseous pressures; and the frame work is of such strength and rigidity as to remain uninfluenced by such pressure. The frame work is placed within or about an oil containing receptacle so that the stationary and movable switch members are immersed in the oil; and, preferably, the frame work is supported independently of, or but incidentally by, the oil receptacle.

A cover or roof for the oil receptacle is provided and a specific feature of the invention is the construction of this roof of materials which are relatively fragile, and inexpensive so that when an unusual pressure is generated within the switch, the roof may be dislodged or blown off the structure and destroyed, thereby relieving the pressure within the switch without damage to the vital components thereof; and the switch may still carry current. The roof may be easily replaced in an inexpensive manner and by an unskilled workman, thereby reconditioning the switch for further operation.

Fig. 1 is a vertical sectional elevation of an electric switch embodying the invention.

Fig. 2 is a transverse sectional elevation of the switch of Fig. 1.

Fig. 3 is a perspective view of the supporting frame work for the stationary and movable switch members.

Fig. 4 is a perspective view of the frame structure for the roof of the switch.

Fig. 5 is a perspective view of a modified form of switch structure adapted for a three pole switch.

Fig. 6 is a sectional detail showing the method of attaching a stationary switch member to the frame work.

Fig. 7 is a sectional detail along line x—x of Fig. 6.

Fig. 8 is a detail along line y—y of Fig. 5.

As here shown, the electric switch embodying the invention includes the stationary switch members 10 and the movable or bridging member 11. The stationary switch members are or may be disposed between and supported upon cross members 12 of a supporting frame 13. Said frame is so arranged that the various structural members comprising it are disposed mainly beneath or remote from the arc zone and those members thereof extended into the gas expansion space of the switch have a relatively small area exposed to a gaseous pressure within the switch. Said stationary switch members 10 are or may be extended through supporting blocks 14, which blocks are fixed to the transverse members 12 of the frame and are or may be so arranged that the stationary switch members extend angularly between said transverse members 12 and depend therebelow.

A switch frame 16 may be secured to the top of the oil receptacle and may carry suitable switch operating mechanism 18, from an operating lever 19 of which mechanism the movable switch member 11 may be suspended.

The supporting frame 13 is adapted to rest upon the bottom of an enclosing oil receptacle 15 which receptacle is adapted to rest upon a suitable support 17. Said supporting frame 13 preferably is fixed to or supported by the oil receptacle 15 at the lower portion only thereof and is otherwise free from an important fixed connection with the receptacle or said frame 16.

In accordance with this invention, the oil receptacle is provided with a destructible roof 20, which roof is adapted to cover the oil receptacle against entrance of rain or snow and is adapted to be dislodged or destroyed by an abnormal increase of gaseous pressure within the receptacle, or under the roof. Said roof 20 may consist of a suitable frame work having the relatively light base members 21 preferably formed of wood or some other light and cheap material. Said base members are shaped to conform to the top of the switch frame 16 and may be secured thereto in any suitable manner, as by the bolts 22, or may merely rest thereupon.

The roof frame may also consist of the upwardly inclined edge members or rafters 23 which may be tied together by the ridge-member 24. Said members 23 are inclined upwardly whereby to provide in the finished roof inclined surfaces adapted to shed water readily. Preferably the various members of the roof frame are but slightly secured together so that they may be readily separated into their individual members upon an abnormal increase in gaseous pressure, as an explosion, within the switch. The roof frame may be covered with a roof 25 which may be of some inexpensive and fragile waterproof material, as for instance, oilcloth, tarred paper, and the like. The roofing material may be applied to the frame work in the manner indicated in Figs. 1 and 2 with the joints therein overlapping each other and the sides of the frame whereby to cover the roof to exclude water from the interior of the switch, and secured to the roof frame by suitable means, as an adhesive, for instance.

The stationary switch members are adapted to extend through the roof covering and may be provided with flanged sleeves 28 which sleeves may be fixed, as by cement, to the switch members.

The roof covering is adapted to overlie and be secured to the flanges 29 of said sleeves in any suitable manner as by an adhesive whereby to prevent entrance of moisture to the switch about the stationary switch members. As thus arranged, the switch is free to vent and relieve itself from a moderate increase in pressure rise due to circuit interruption under normal loads. When, however, the circuit is interrupted under a severe load, or an explosion occurs within the switch, the roof is adapted to be dislodged from covering relation with the oil receptacle, or destroyed, and the frame work and the roof covering ruptured, thereby relieving the switch from such pressure and preventing damage to the vital components thereof. Some oil may be thrown from the switch but the switch members will not be damaged as the area thereof presented to the action of the explosion pressure is insufficient to cause displacement thereof or damage thereto, and the switch may again be closed and carry current although it may not be in condition immediately to interrupt the circuit under heavy overload.

After the roof of the switch has been destroyed or damaged, it may be repaired or rebuilt and the switch is then again in condition for further service. The reconstruction of the roof may be made by an unskilled mechanic and in an inexpensive manner.

The separate frame members of the roof structure preferably are relatively short in length or at least so short that when blown off the switch they can not fall across the live circuit leads to short circuit the line.

In Fig. 5, a switch construction is illustrated as arranged for a three pole switch. In this illustration, the switch frame includes the parallel and spaced frame members 30 which extend longitudinally of the frame and are adapted to support the stationary switch members 32. Each stationary switch member may be supported from the frame members 30 by means of supporting plates 33, which plates preferably are as small in area as is practicable and said plates are or may be secured in any suitable manner to said frame members 30. The stationary switch members 32 are passed through apertures in said plates 33 and are fixed to said plates. The roof construction in this particular figure is of relatively short and thin boards 34, which boards are extended between and rest upon the adjacent supporting members 30 of the opposite sides of the switch structure and said boards may be grooved to provide overlapping edges as shown in Fig. 8 to exclude water from entrance to the oil containing receptacles although not appreciably interlocking the boards.

Said boards 34 are adapted to extend laterally over the frame members 30 for the purpose of excluding water from entrance to the oil receptacle around the junction of said boards with said frame members 30. The space between said frame members 30 may be covered by a suitable covering material 35 which may comprise for instance, oil cloth, and the oil cloth may be adherently united to the frame members and arranged to overlap the switch member supporting plates 33 in water tight relation therewith. The spaces between the frame members 30 and the side edges of the supporting frame may be covered by small sections 36 of boards or other material applied as indicated in connection with the main roof section 34. As thus arranged it is apparent that the roof will shed water and when an explosion or other undue pressure rise occurs under the roof, the components of the sections 34 and 36 and 35 will be displaced from the switch thereby to relieve the internal pressure. After the roof has been destroyed, or displaced, the separate sections may be again collected and applied to the frame work to recondition the roof for further service and damaged sections may be replaced.

The frame work above described may be contained within a single oil receptacle in the manner illustrated in Figs. 1 and 2 or one or more oil receptacles 40 may be disposed within the frame structure to surround and enclose the lower ends of the switch members.

The construction herein illustrated may be otherwise modified without departing from the spirit of the invention.

I claim:

1. An electrical apparatus having an enclosing casing adapted to contain an insulating fluid, circuit terminals extended into the fluid, and a cover for the casing which is fragile and is adapted to be disrupted when an abnormal pressure occurs within the casing and uncover the casing and relieve the pressure.

2. An electrical apparatus having an enclosing casing adapted to contain an insulating fluid, a cover for the casing which is fragile and is adapted to be disrupted when an abnormal pressure occurs within the casing and uncover substantially the entire top of the casing and relieve the pressure, and circuit terminals extended through said disruptible cover into the fluid of the casing and having supporting means independently of said cover.

3. An electric switch having a receptacle adapted to contain an arc-quenching fluid, a roof disposed above the receptacle, and insulated switch terminals extended through said roof into the fluid in said receptacle and having supporting means independent of said roof, said roof constructed and arranged to be blown from covering relation with said receptacle when an abnormal pressure occurs within the receptacle and uncover the receptacle and relieve the pressure and also to be blown into such light-weight pieces as not to damage said switch-terminals when blown thereagainst.

4. An electric switch having a receptacle adapted to contain an arc-quenching fluid, a roof disposed above the receptacle which is fragile and is constructed and arranged to be destroyed when an abnormal pressure occurs within the receptacle and thereby uncover the receptacle and relieve the pressure, and switch terminals extended through said fragile roof into the fluid in said receptacle and having supporting means independent of said fragile roof.

5. An electric switch having a receptacle adapted to contain an arc-quenching fluid, and a roof disposed above the receptacle and composing relatively fragile material adapted to be ruptured and broken when an abnormal pressure occurs within the receptacle and uncover the receptacle and relieve the pressure.

6. An electric switch having an oil receptacle, switch members extended therein, means to support said switch members independently of the receptacle, and a roof for the receptacle through which the switch members are extended, said roof constructed and arranged to be dislodged from covering relation with the receptacle when an abnormal pressure occurs under the roof whereby to uncover the receptacle and relieve the pressure.

7. An electric switch having an oil receptacle, switch members extended therein, means to support said switch members independently of the receptacle, and a roof for the receptacle through which the switch members are extended, said roof constructed of weakly-connected components arranged to be separated when an abnormal pressure occurs under the roof, whereby to uncover the receptacle and relieve the pressure.

8. An electric switch having an oil receptacle, switch members extended therein, means to support said switch members independently of the receptacle, and a roof for the receptacle through which the switch members are extended, said roof constructed of relatively fragile cover-material adapted to be destroyed when an abnormal pressure occurs under it and uncover the receptacle and relieve the pressure.

9. An electric switch having an oil receptacle, a fixed support, a supporting frame connected with said support, switch members carried by said frame and extended into the oil receptacle, and a roof for said receptacle constructed of components arranged to separate when an abnormal pressure occurs under the roof and uncover the receptacle and relieve the pressure.

10. An electric switch having an oil receptacle, a supporting frame disposed within the receptacle and resting upon the bottom thereof, switch members carried by said frame, and a roof disposed over the top of said receptacle and through which said switch members are extended, said roof composed of relatively fragile components adapted to yield and separate when an abnormal pressure occurs under the roof and uncover the receptacle and relieve the pressure.

11. An electric switch having an enclosing casing adapted to contain an arc-quenching fluid, means to support one wall of said casing against displacement, a supporting frame carried by said supported casing-wall and disposed within said casing, and switch members carried by said frame, said casing having a wall through which said switch members are extended, which wall is adapted to yield when an abnormal pressure occurs within the casing and uncover the casing and relieve the pressure.

12. An electric apparatus including current-carrying components, an enclosing casing therefor having an easily destructible wall through which said current-carrying components are extended, and means to support said components against displacement due to explosions within said casing which are destructive to said destructible casing wall.

13. The combination of an enclosure having a fragile roof, electrical apparatus contained within the enclosure having insulators extended through said fragile roof, and supporting means for said insulators arranged to admit of the rupture of said roof without displacement of said insulators.

14. An electric switch having an enclosing casing adapted to enclose an arc-quenching fluid, means to support one wall of said casing against displacement due to abnormal pressures within the casing, a supporting frame carried by said casing-wall, and switch-members carried by said frame and immersed in the fluid, said casing having another wall which is structurally weak and is adapted to rupture upon the occurrence of severe internal casing-pressure.

In testimony whereof, I have signed my name to this specification.

GEORGE A. BURNHAM.